(No Model.)  2 Sheets—Sheet 1.
H. NEHRMEYER.
AUTOMATIC COTTON OR CORN PLANTER.

No. 516,446. Patented Mar. 13, 1894.

WITNESSES:
Fred G. Dieterich
Jos. A. Ryan

INVENTOR
Henry Nehrmeyer
BY
ATTORNEYS.

(No Model.) 2 Sheets—Sheet 2.
H. NEHRMEYER.
AUTOMATIC COTTON OR CORN PLANTER.

No. 516,446. Patented Mar. 13, 1894.

WITNESSES:
Fred G. Dieterich
Jos. A. Ryan

INVENTOR
Henry Nehrmeyer
BY Munn & Co.
ATTORNEYS.

UNITED STATES PATENT OFFICE.

HENRY NEHRMEYER, OF REINHARDT, TEXAS.

AUTOMATIC COTTON OR CORN PLANTER.

SPECIFICATION forming part of Letters Patent No. 516,446, dated March 13, 1894.

Application filed June 29, 1893. Serial No. 479,147. (No model.)

*To all whom it may concern:*

Be it known that I, HENRY NEHRMEYER, residing at Reinhardt, in the county of Dallas and State of Texas, have invented a new and Improved Automatic Cotton or Corn Planter, of which the following is a specification.

My invention has for its object to provide a simple inexpensive planting machine, in which a series of planting devices is arranged, and adapted to travel in parallel rows and to automatically plant the seed without the necessity of being guided by hand.

It has also for its object to provide a machine of this character in which the several planting devices can be adjustably secured upon the main frame to plant rows spaced apart to the widths desired, and in which all the planters while held to travel in parallel rows and from independent lateral movement, are each capable of independent vertical movement.

With other objects in view and which will hereinafter appear, the invention consists in the sundry peculiar and novel combination of parts, all of which will hereinafter be fully set out in the description and particularly pointed out in the claims, reference being had to the accompanying drawings in which—

Figure 1:
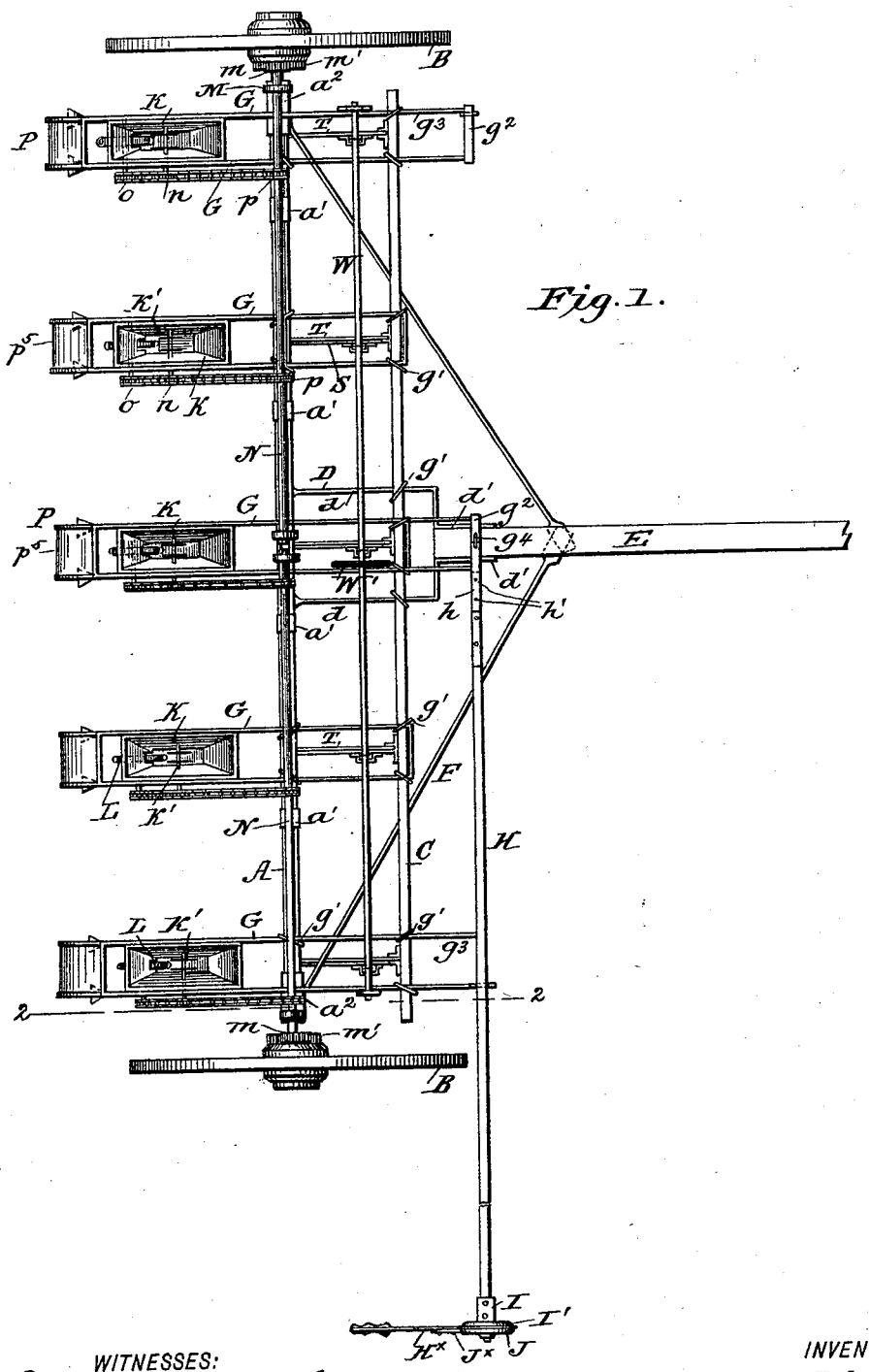
Figure 2:
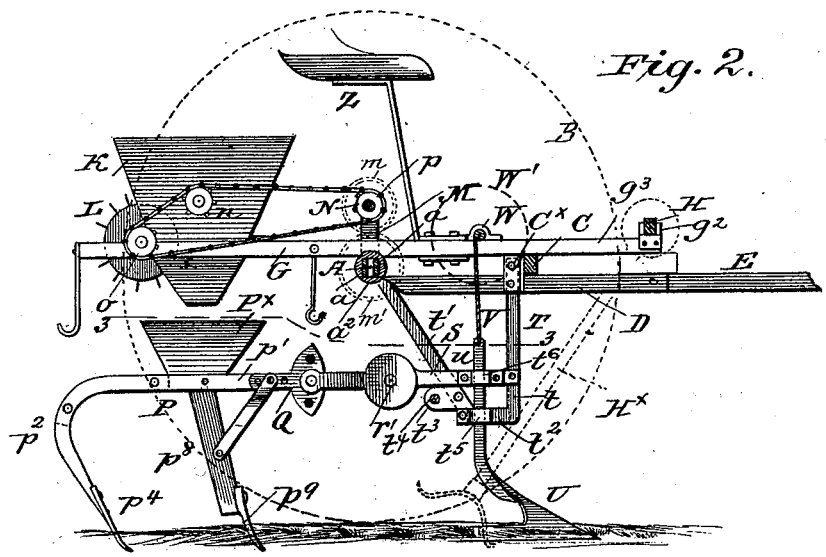
Figure 3:
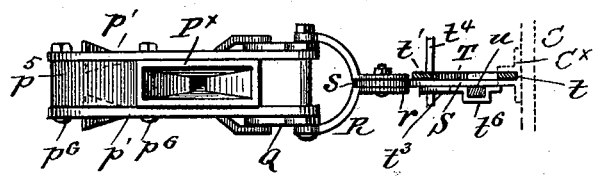
Figure 4:
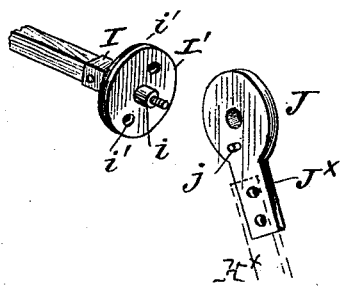

Figure 1 is a plan view of my improved planter. Fig. 2 is a vertical longitudinal section, of the same on the line 2—2 Fig. 1. Fig. 3 is a detail horizontal section on the line 3—3 Fig. 2 and Fig. 4 is a detail view hereinafter particularly referred to.

In the practical construction of my improved planter the main frame comprises the axle A, the wheels B, the front bar C, central yoke frame D, tongue E and diagonal brace bars F. The axle A consists of a pair of parallel bars $a$ held spaced apart and braced by the space blocks $a'$, the ends of such bars fitting cuff like members $a^2 a^2$ which have stub axles, upon which the wheels are journaled. The central or yoke like frame section D, has the rear ends of its side arms $d$, bolted to the under side of axle A, while its front end projects under and is clipped to the front bar C as clearly shown in Fig. 1, the front ends $d'$ $d'$ of such side bars being bent inward toward each other to form clamp members in which the rear end of the tongue is bolted.

G indicates a series of rectangular frames (five being shown) which are supported on the axle and the front bar C and are held for lateral adjustment thereon, whereby the rows may be planted close or wide apart, as desired, suitably arranged clips $g'$ being employed for securing such frames on the main frame, as clearly shown in Fig. 2. It will be noticed by reference to Fig. 1 that all of the frames G extend rearward from the axle, to the same distance, while the end ones and the central one project beyond bar C, considerably further than the intermediate ones. The object of projecting such end frames forward, is for the purpose of providing simple end supports for the marker bar H. To this end a movable cross piece $g^2$ is fitted on the front ends of the side arms $g^3$ of the end frames G which have forked vertical portions in which marker bar H is adapted to seat. The central frame G has its front ends also connected by a cross piece $g^2$, and such piece has an eye $g^4$, adapted to receive the metal strap bar $h$ of the marker bar, which bar $h$ has a series of apertures $h'$ whereby the bar H can be adjustably secured to render the same extensible.

Upon the outer end of the bar H is secured a sleeve I (see Fig. 4) which terminates in a disk like member I' which has a central projecting stub $i$ on which fits a disk member J, which has a stud $j$, adapted, when the disks J and I are fitted together to fit either one of the sockets $i'$ in the disk I, such sockets being disposed diametrically opposite each other whereby when the disk J is adjusted in one position the marker will be held down against the ground, and when adjusted to its other position it will be held up out of the way, during the time the machine makes a turn or is transported on and off the field. It will be noticed in Fig. 4 the disk J has an apertured shank member J$^\times$, to which the marker arm H$^\times$ is secured, upon the lower end of which is secured a marker finger in the usual manner.

Upon the rear end of each of the frames G is mounted a seed box K in which is journaled a stirrer K' and a dropping wheel L of any well known construction. It will be noticed by reference to Fig. 2, that the seed boxes and dropping devices are located some distance above the ground, such construction avoiding, as it were, the danger of the rubbish clogging up with the seed box drive mechanism, which is usually the case when such mechanism is disposed close to the ground.

As a simple and effective driving means I employ drive shafts N journaled in short vertical standards M projected up from the axle, upon the ends of which are held slidable gears $m$ which are adapted to be slid into gear with gear members $m'$ on the hubs of the drive wheels.

Upon the ends of the stirrer and dropping wheel shafts are secured sprocket wheels $n$ and $o$ over which and sprocket wheels $p$ keyed to the shafts N pass the drive chains. Thus it will be readily understood that as the machine travels over the field and the gears $m$ are slid into gear with gears on the drive wheels, the seed dropping devices will be in operation.

Below each planter frame G is disposed a supplemental planter frame P, of a width corresponding to that of frames G, and such frames consist each of a pair of side beams $p'$ the ends of which curve down as at $p^2$ and form bearings to receive the covering shovels $p^4$, such beams being braced and spaced apart by the spacing members $p^5$, secured between such beams, by the bolts $p^6$.

At the front end of the beams $p'$ are rigidly secured clevis members Q, to which are adjustably secured bail members R, the front ends of which terminate in bifurcated disk like ears $r$ centrally apertured as at $r'$ which ears are pivotally secured to disk like ears $s$ on the rear ends of horizontal beams S, which are rigidly secured to the main frame, in a manner most clearly shown in Figs. 2 and 3 of the drawings. By reference to such figures it will be seen that bolted to the front bar C is a series of clips $C^x$ to which are bolted a series of depending frames T, each formed of a vertical member $t$, a horizontal portion $t^2$ and a rearwardly and upwardly extending brace member $t'$ which is secured at its upper end to the axle, and to such portions $t$ and $t'$ are secured the beams S as shown.

To brace the several frames T together, I use apertured plates $t^3$, which are secured to and projected rearward from the inclined member $t'$, through which passes a tie rod $t^4$, as most clearly shown in Figs. 2 and 3; and to horizontal members $t^2$, are secured guide or angle plates $t^5$.

$t^6$ indicate guide boxes secured to the beams S to register with the guides $t^5$ as shown.

U indicates opener plows, the standards $u$ of which are guided and are held for vertical adjustment in the guides $t^5$ $t^6$, such adjustment being provided by connecting the upper ends of such standards with flexible connections V, the upper ends of which are wound about a shaft W journaled on the top of the frames G, which shaft has a hand wheel W' which in the practical construction has detent devices, (not shown,) whereby it can be rotated and held to its desired position when it is desired to adjust the opener plows.

Upon the frame P is secured a hopper $P^x$ which receives the seed from the upper hopper, and which has a discharge spout or boot $p^8$, at the front end of which is secured the usual opener plow $p^9$, such boot being braced to the side beams $p'$ as clearly shown in the drawings.

Z indicates the driver's seat.

From the foregoing description taken in connection with the drawings, the complete operation and the advantages of my improved machine will be readily understood.

It will be observed that by connecting the seed box frames G to the main frame in the manner shown the same can be easily adjusted laterally to plant rows such distances apart as may be desired. Furthermore by connecting the furrow opener plows to the main frame as shown, it is manifest, by moving the clip guides on the front bar C and the frames T, such plows can be readily set, relatively to the adjustment of frames G, and as such frames T are set, it follows the planter or digger frames P can be moved laterally to register with the said upper frames G.

By connecting the frames P with the frames T in the manner shown and described, such frames P while being held from lateral movement, will be free to move vertically to accommodate themselves to the unevenness of the ground. Finally by constructing the several parts of the machine in the manner shown, the same will effectively serve as an automatic planter, adapted to plant a number of rows at one operation, in which the services of one man will be required, that of the driver.

In the practical construction of my improved machine, the seed boxes may be held for longitudinal adjustment on the frames G, whereby to take up the slack of the drive chains, when desired.

Having thus described my invention, what I claim, and desire to secure by Letters Patent, is—

1. An automatic planting machine comprising a frame, including the main axle, the drive wheels, and a front bar parallel with the axle, a series of depending frames secured to such bar and axle, a series of opener plows held on such frames, a series of digger or planting devices, secured and projected rearward from such depending frames, a series of supplemental frames mounted and secured on the axle and front bar and provided with extensions projected rearward over the digger or planting devices and seed dropping mechanism mounted on the said rearward extensions over the digger devices, and means for operating such seed dropping devices from the main drive shaft, all arranged substantially as shown and for the purposes described.

2. In an automatic planting machine, in combination, the main frame, a series of planter frames secured thereon, the planting devices mounted on such frames, the front portions of the end frames extended to form marker bar supports, and the marker bar hinged at its inner end to the main frame, its outer end adapted to rest on the extensions of such end planter frames, and the marking devices on such outer end of the bar all substantially as shown and described.

3. The combination with the main frame and the combined planting and digger frames P, of the rearwardly projecting members S connected to the main frame, formed at their rear ends with disk portions $s$, and the yokes R pivotally connected at their rear ends to the front end of the frames P, their front ends having bifurcated disk portions, held to embrace the disk portions $s$, and the pivot connection for such disk portions all arranged substantially as shown and for the purposes described.

4. In an automatic planting machine, the combination with the main frame, having a series of depending members at its front end, such members having rearwardly extending portions terminating in disk like ears, of the planter frames P and the intermediate connections consisting of bail like portions embracing the end of such frames, and terminating in bifurcated disk like ears adapted to fit the disk like ends of the rear extending portions of the depending frames, all arranged substantially as shown whereby such planter frames will be held from lateral movement but adapted to swing vertically as set forth.

5. In an automatic planting machine essentially as described, the combination with the main frame, of a marker device, comprising a bar hinged at its inner end to the main frame, its outer end terminating in a disk like member, having sockets in its outer face at diametrically opposite points, the arm having a disk member fitting the disk on the bar and provided with a stud adapted to fit either of the sockets on the arm and means for securing the arm and bar disks together all substantially as and for the purposes described.

6. In a planting machine of the character described, the combination with the main frame including the laterally adjustable depending front members, and the furrow opener plows held for vertical adjustment on such frames, of the upper planting frames secured upon the main frame, the seed holding and dropping devices mounted on such frames, the drive mechanism for operating such dropping devices, operated by the drive wheels, and the lower planter frames having the opener and cover plows secured to the depending frame members, and held from lateral movement and adapted to swing vertically all substantially as and for the purposes described.

HENRY NEHRMEYER.

Witnesses:
  J. M. HAYES,
  C. B. STEPHENSON.